March 24, 1953 — J. PUGEL — 2,632,587
CLOTHES RACK FOR VEHICLES
Filed May 1, 1950 — 2 SHEETS—SHEET 1

Inventor
JOSEPH PUGEL.
By: C. Lauren Matby
Attorney.

March 24, 1953     J. PUGEL     2,632,587
CLOTHES RACK FOR VEHICLES
Filed May 1, 1950     2 SHEETS—SHEET 2
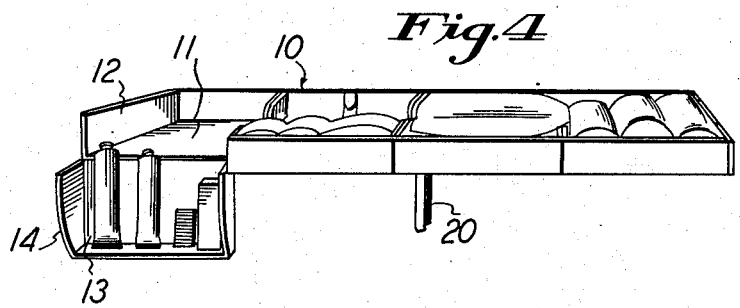
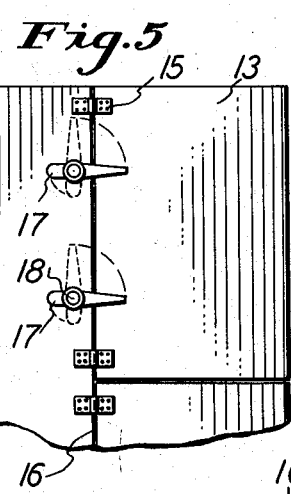
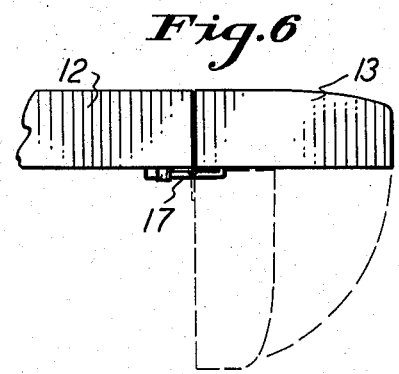
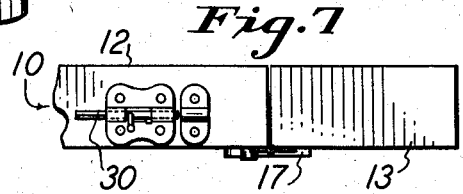
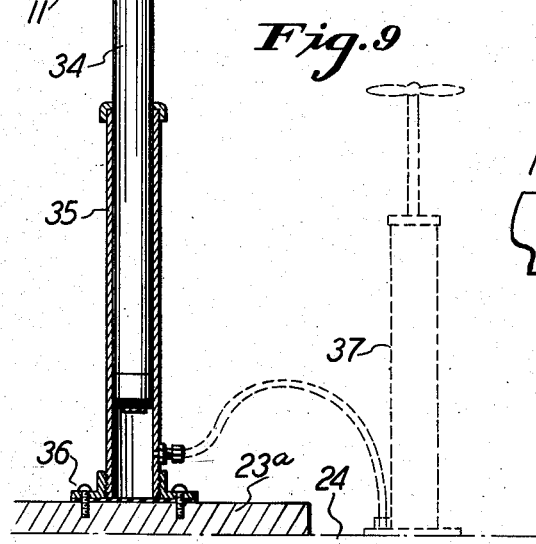
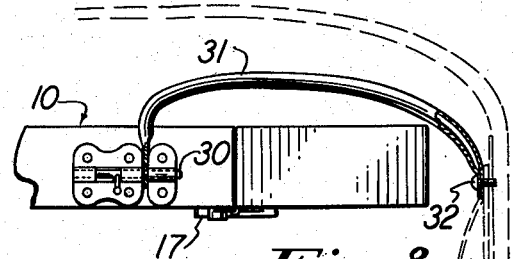
Inventor
JOSEPH PUGEL.
By: C. Lauren Maloly
Attorney.

Patented Mar. 24, 1953

2,632,587

UNITED STATES PATENT OFFICE 2,632,587

CLOTHES RACK FOR VEHICLES

Joseph Pugel, Los Angeles, Calif.

Application May 1, 1950, Serial No. 159,236

1 Claim. (Cl. 224—42.1)

This invention relates to supports for apparel and the like, and more especially to an apparel rack for mounting within the body of a motor vehicle.

An object of the invention is to provide a simple, practical and inexpensive rack for articles of apparel and the like, for use in motor vehicles.

Another object of the invention is to provide a novel rack for clothing and other apparel which may be readily mounted within the body of a motor vehicle in a position adjacent the roof in a manner that will not interfere with normal occupancy of the vehicle.

A further object of the invention is to provide an apparel rack of the character described having convenient and easily operable means positioning the rack adjacent the ceiling of the vehicle body.

A further object of the invention is to provide improvements in an apparel rack for mounting within the body of a motor vehicle, which improvements include portions which may be rendered accessible without disturbing the remainder of the rack.

Other objects and advantages will appear and be brought out more fully in the following specification, reference being had to the accompanying drawing wherein:

Fig. 4 is a perspective view of the rack showing one of the adjustable portions in an adjusted position.

Fig. 5 is a fragmentary bottom view showing the mounting means for one of the adjustable sections.

Fig. 6 is a partial end view of one of the adjustable sections.

Figs. 7 and 8 are fragmentary elevation views of the rack showing modified means for supporting the same in a motor vehicle.

Fig. 9 is a fragmentary elevation view partly in section showing modified adjustable support means for the rack.

Figure 1:
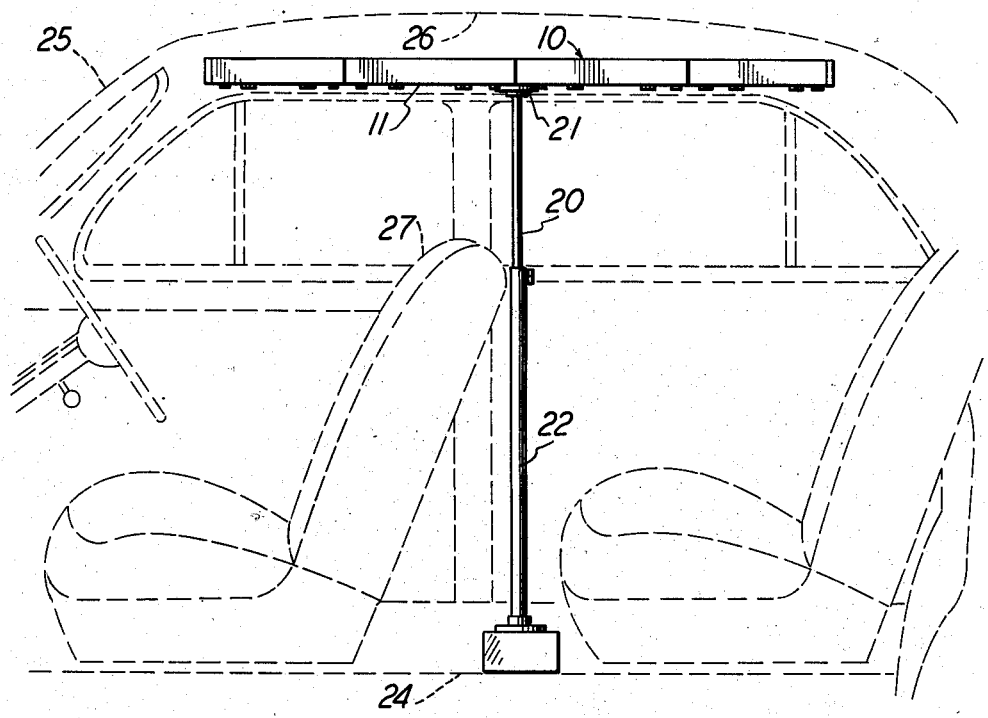
Fig. 1 is a side elevation view of an embodiment of my invention shown as mounted within the body of a motor vehicle.

Referring more particularly to the drawings, and especially to Figures 1 to 6, I show a rack 10 comprising a platform 11 which is illustrated as being substantially flat and rectangular in outline and having end boards 12 as shown. A plurality of adjustable sections or trays 13 having side boards 14 are adjustably secured as by hinges 15 to the side edges 16 of the platform 11. A plurality of wing buttons 17 are provided with pivot mountings 18 for attachment to platform 11 and serve to support trays 13 in horizontal position, but permit the trays to be swung downwardly as shown in Figure 4.

A plurality of rods 20 are secured as by flanges 21 to platform 11, and have telescoping support in stanchions 22 and are secured in any elevated position by lock screws 23. Stanchions 22 may be mounted on a common base 23a of any desired character, or each stanchion may have its own base or be mounted directly on the floor 24 of a motor vehicle body 25. Figure 1 shows the rack of my invention positioned with the body of a motor vehicle 25 with the platform 11 held in elevated position immediately below the roof 26 of the vehicle with the stanchions 22 adjacent but in the rear of the front seat 27 of the vehicle.

One or more of the trays 13 may be provided with straps 28 which are secured thereto and serve to hold certain articles such as shoes, boots, or otherwise, to the trays while in adjusted position, and to facilitate loading and unloading of the trays with various articles which are desired to be carried.

In Figures 7 and 8 I show modified means for supporting the rack of my invention within the body of a motor vehicle. In these figures a pair of slidable bolts 30 are mounted on each end board 12 at the outer ends thereof, and a bracket 31 having an end hole for engagement with one of the bolts 30 is formed as shown and secured as by screw 32 to a side wall portion 33 of the motor vehicle. By this type of mounting the rack 10 may be securely supported in the vehicle but readily removed when desired.

In Figure 9 I show modified means for supporting and elevating the platform 11 of my invention. In this figure I show the platform 11 suitably mounted on one or a pair of pistons 34 having telescoping engagement in a cylinder 35 secured to a base member 23 or the floor 24 of the vehicle. Cylinder 35 is an air cylinder and by being supplied with air pressure such as from a pump 37, piston 34 will be raised, thus elevating the platform 11 of the rack.

Figure 2:
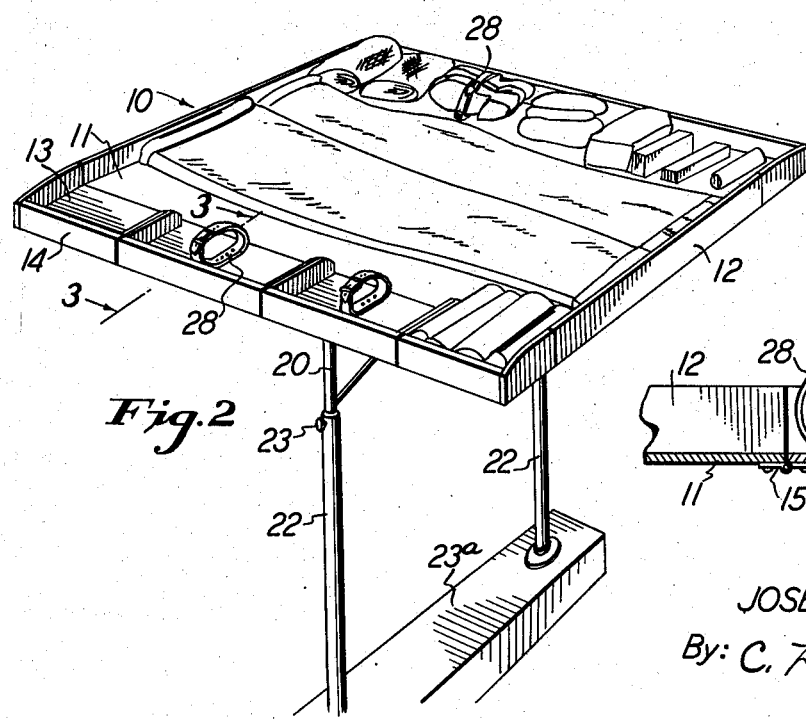
Fig. 2 is a perspective view of the same.
Figure 3:
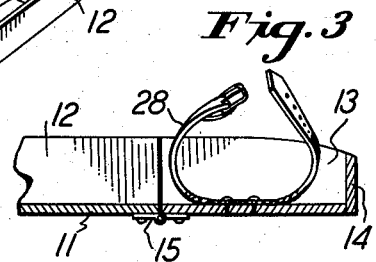
Fig. 3 is a partial sectional view taken along the line 3—3 of Figure 2.

The operation of the invention should be obvious from the foregoing description. The apparel rack of my invention can be readily mounted within a motor vehicle as shown in Figures 1 and 8 and, while in a lowered position, various articles of clothing as indicated in Figures 2 and 4, may be placed on the platform 11 and the racks 13. Thereupon the platform 11 may be raised to the position shown in Figure 1. Thereafter if it was desired to load or unload one or more of the trays 13, the same may be swung down to adjusted position as shown in Figure 4 by turning the wing buttons 17 associated with each of such trays. Side boards 14 serve to prevent the articles carried by the trays from dropping out, however the trays may be rotated farther to facilitate removal or the replacing of any of the articles to be carried by such trays.

It will be understood that the foregoing description is illustrative rather than restrictive of my invention and that changes and modifications may be made without departing from the spirit and scope of the subjoined claim.

Having described my invention what I claim is:

A removable apparel rack for motor vehicles as described comprising in combination a platform and adjustable height means to support the platform within a car body adjacent the roof, said platform adapted to support a plurality of articles of apparel or the like, said platform having a plurality of hinge connected marginal trays adapted to be swung downwardly to permit loading and unloading, and means to secure said trays in article supporting position, one of said trays having fastening means for securing an article thereto.

JOSEPH PUGEL.

REFERENCES CITED

The following references are of record in the file of this patent:

UNITED STATES PATENTS

| Number | Name | Date |
| --- | --- | --- |
| 1,189,835 | Labadie at al. | July 4, 1916 |
| 1,308,350 | Gay | July 1, 1919 |
| 1,711,784 | Heiber | May 7, 1929 |
| 1,913,387 | Hayward | June 13, 1933 |
| 2,337,505 | Swift | Dec. 21, 1943 |
| 2,472,132 | Walker | June 7, 1949 |
| 2,550,150 | Hartley | Apr. 24, 1951 |

FOREIGN PATENTS

| Number | Country | Date |
| --- | --- | --- |
| 490,148 | Great Britain | Aug. 10, 1938 |